US009880938B2

(12) United States Patent
Shivarudraiah et al.

(10) Patent No.: US 9,880,938 B2
(45) Date of Patent: Jan. 30, 2018

(54) SYSTEM AND METHOD FOR COMPACTING PSEUDO LINEAR BYTE ARRAY

(71) Applicant: ORACLE INTERNATIONAL CORPORATION, Redwood Shores, CA (US)

(72) Inventors: Ashok Shivarudraiah, Fremont, CA (US); Douglas Surber, Orinda, CA (US); Jean De Lavarene, Versailles (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 27 days.

(21) Appl. No.: 14/864,192

(22) Filed: Sep. 24, 2015

(65) Prior Publication Data

US 2016/0092365 A1     Mar. 31, 2016

Related U.S. Application Data

(60) Provisional application No. 62/056,448, filed on Sep. 26, 2014.

(51) Int. Cl.
*G06F 12/08*     (2016.01)
*G06F 12/0871*     (2016.01)
*G06F 17/30*     (2006.01)

(52) U.S. Cl.
CPC .... *G06F 12/0871* (2013.01); *G06F 17/30132* (2013.01); *G06F 17/30492* (2013.01); *G06F 2212/1044* (2013.01); *G06F 2212/465* (2013.01)

(58) Field of Classification Search
CPC ................ G06F 12/0871; G06F 17/30; G06F 17/30492; G06F 17/30132
USPC ........................................................ 711/118
See application file for complete search history.

(56) References Cited

U.S. PATENT DOCUMENTS

| 4,698,749 | A | 10/1987 | Bhadriraju | |
| 6,018,794 | A * | 1/2000 | Kilpatrick | G11C 7/06 365/205 |
| 8,285,758 | B1 | 10/2012 | Bono | |
| 2003/0084374 | A1* | 5/2003 | Chatterjee | G06F 11/366 714/33 |
| 2003/0130909 | A1 | 7/2003 | Caci | |
| 2009/0282369 | A1* | 11/2009 | Jones | G06F 17/30554 715/848 |
| 2014/0092678 | A1* | 4/2014 | Feekes | G06F 12/06 365/163 |

(Continued)

Primary Examiner — Pierre-Michel Bataille
(74) Attorney, Agent, or Firm — Tucker Ellis LLP

(57) ABSTRACT

In accordance with an embodiment, described herein is a system and method for compacting a pseudo linear byte array, for use with supporting access to a database. A database driver (e.g., a Java Database Connectivity (JDBC) driver) provides access by software application clients to a database. When a result set (e.g., ResultSet) is returned for storage in a dynamic byte array (DBA), in response to a database query (e.g., a SELECT), the database driver determines if the DBA is underfilled and, if so, calculates the data size of the DBA, creates a static byte array (SBA) in a cache at the client, compacts the returned data into the SBA, and stores the data size as part of the metadata associated with the cache. In accordance with an embodiment, the DBA and the SBA can use a same interface for access by client applications.

20 Claims, 4 Drawing Sheets

(56) References Cited

U.S. PATENT DOCUMENTS

| | | | |
|---|---|---|---|
| 2014/0143519 A1* | 5/2014 | Heidelberger | G06F 12/1027 711/214 |
| 2014/0281258 A1* | 9/2014 | Callaway | G06F 12/0891 711/135 |
| 2015/0127623 A1* | 5/2015 | Gracie | G06F 12/0253 707/693 |
| 2015/0269179 A1* | 9/2015 | McClements | G06F 12/084 711/130 |
| 2016/0012155 A1 | 1/2016 | Shivarudraiah | |
| 2016/0077761 A1 | 3/2016 | Stabrawa | |
| 2016/0092365 A1 | 3/2016 | Shivarudraiah | |

* cited by examiner

SYSTEM AND METHOD FOR COMPACTING PSEUDO LINEAR BYTE ARRAY

CLAIM OF PRIORITY

This application claims the benefit of priority to U.S. Provisional Patent Application titled "TECHNIQUES FOR COMPACTING PSEUDO LINEAR BYTE ARRAY", Application No. 62/056,448, filed Sep. 26, 2014, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and databases, and are particularly related to database access including a system and method for compacting a pseudo linear dynamic byte array in a client caching infrastructure.

BACKGROUND

In a database environment that enables access by software applications to data in a database, when a query is made by a client (e.g., an application server) to retrieve data, a result set (e.g., ResultSet) cache can be created on the client side, and the returned data stored in a byte array, together with accessor prototypes and statement metadata. However, since a byte array can be quite large, caching such a structure can cause memory pressure on the client's database driver, and reduce the client's ability to cache additional data. Additionally, the size of the result set cache must be constantly calculated, for status reporting to the database server and for managing the result set size cache within limits. Each such calculation may require a trip to the server to determine the number of bytes in the byte array, which is a cumbersome and resource-expensive operation.

SUMMARY

In accordance with an embodiment, described herein is a system and method for compacting a pseudo linear byte array, for use with supporting access to a database. A database driver (e.g., a Java Database Connectivity (JDBC) driver) provides access by software application clients to a database. When a result set (e.g., ResultSet) is returned for storage in a dynamic byte array (DBA), in response to a database query (e.g., a SELECT), the database driver determines if the DBA is underfilled and, if so, calculates the data size of the DBA, creates a static byte array (SBA) in a cache at the client, compacts the returned data into the SBA, and stores the data size as part of the metadata associated with the cache. In accordance with an embodiment, the DBA and the SBA can use a same interface for access by client applications.

DETAILED DESCRIPTION

Figure 1:
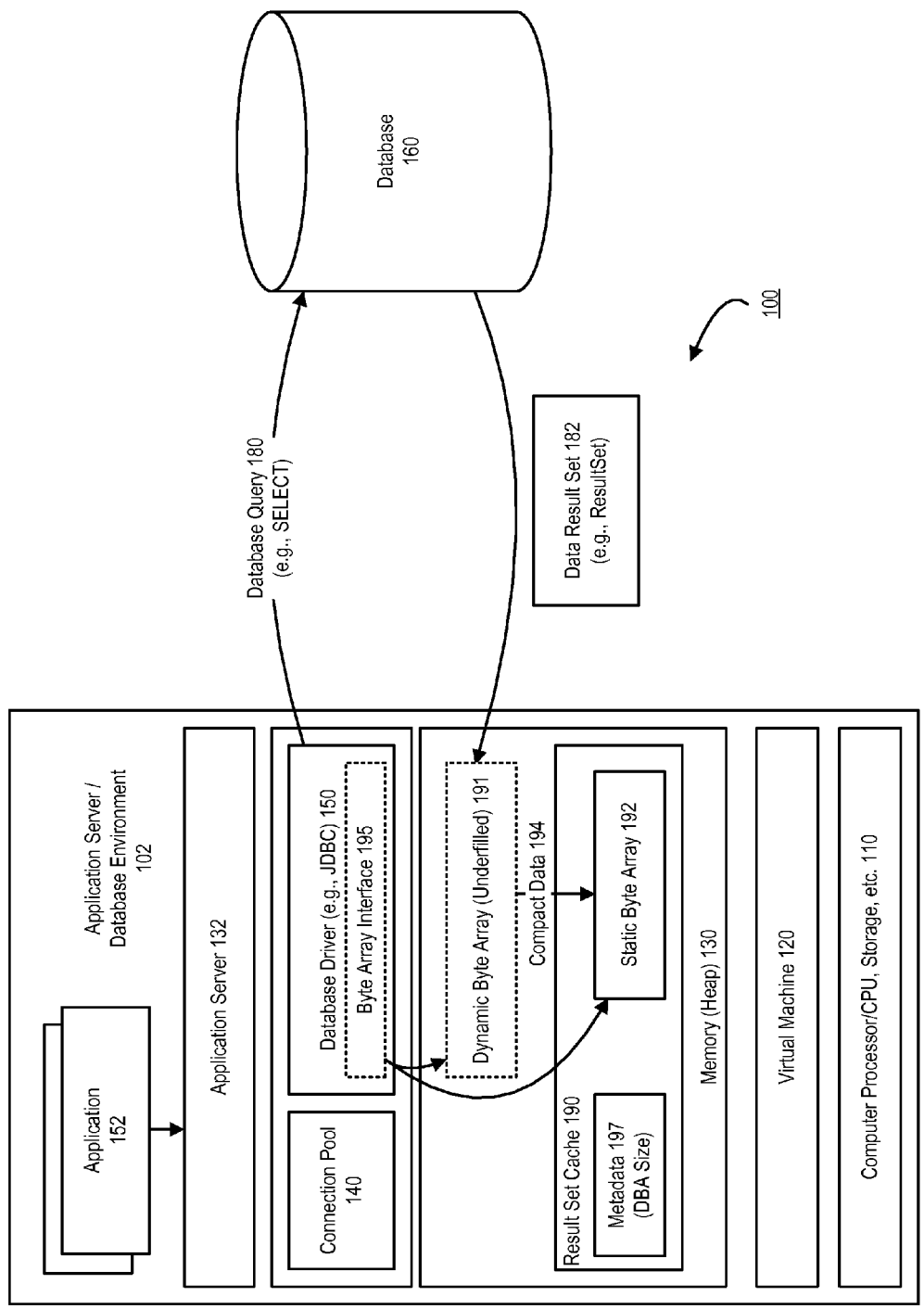
FIG. 1 illustrates a system for compacting a pseudo linear dynamic byte array, in accordance with an embodiment.

As described above, in a database environment that enables access by software applications to data in a database, when a query is made by a client (e.g., an application server) to retrieve data, a result set (e.g., ResultSet) cache can be created on the client side, and the returned data stored in a byte array, together with accessor prototypes and statement metadata.

When queries are executed repeatedly, the results can be retrieved directly from cache memory without fetching rows from the database server, which eliminates round-trips to the database server and reduces processor/CPU usage. Additionally, the client's result set cache can transparently keep the result set consistent with any session state or database changes that might affect the cached result sets, which allows significant improvements in response time for frequent client SQL query executions and fetching rows.

However, client result set caching comes with disadvantages, such as increased memory pressure on the client's database driver, and a reduction in the client's ability to cache additional data.

In accordance with an embodiment, described herein is a system and method for compacting a pseudo linear byte array, for use with supporting access to a database. A database driver (e.g., a Java Database Connectivity (JDBC) driver) provides access by software application clients to a database. When a result set (e.g., ResultSet) is returned for storage in a dynamic byte array (DBA), in response to a database query (e.g., a SELECT), the database driver determines if the DBA is underfilled and, if so, calculates the data size of the DBA, creates a static byte array (SBA) in a cache at the client, compacts the returned data into the SBA, and stores the data size as part of the metadata associated with the cache. In accordance with an embodiment, the DBA and the SBA can use a same interface for access by client applications.

In accordance with an embodiment, the data to be stored in a DBA can be compacted by the JDBC driver to remove holes caused by a difference between a maximum anticipated size of the data to be received (e.g., as indicated by max_size), and an actual size of the data that is received. The compacted data in DBA may still contain unused spaces within a table row.

In accordance with an embodiment, a determination can be made as to whether a DBA would be underfilled, by examining the sizes of the chunks associated with the DBA and the sizes of the data available within those chunks. When the size of the data to be stored in the DBA is greater than a prescribed threshold then the DBA is considered not underfilled. However, if the size of the data to be stored in the DBA is less than the prescribed threshold, then the DBA is determined as being underfilled, and a static bye array (SBA) can be created and filled with the data from the DBA.

For example, if the size of data is determined to be below a prescribed threshold of 60% of the size of the DBA, then it may be beneficial to create the SBA.

In accordance with an embodiment, when an SBA is filled with the data from a DBA, the data can be compacted into an SBA which has the same interface with the DBA, such that the DBA and the SBA exposes the same interface for access by client applications. An existing interface associated with the SBA can be overridden, to avoid calculations used by the DBA jumping chunks when compacting the data in the DBA.

In accordance with an embodiment, the size of the data in a DBA can be calculated before the data is to be compacted, and stored as part of the metadata associated with the result set cache. When a new result set is received, the data size of the DBA can be calculated again, and the metadata updated with the new data size, so that the new data size can be sent to the database server for status reporting. The size of a result set can also be calculated to determine if the result set can be cached.

By calculating the data size of a DBA at the time the data is compacted, and saving the data size in the metadata, frequent recalculations of the data size of the DBA for status reporting to the data server can be avoided, and throughput and performance of the result set cache can be improved.

FIG. 1 illustrates a system for compacting a pseudo linear dynamic byte array, in accordance with an embodiment.

As shown in FIG. 1, in accordance with an embodiment and by way of example, the system 100 can include an application server or database environment (e.g., an Oracle Fusion Applications environment) 102; a physical computer processor/CPU and storage 110; a virtual machine (e.g., a Java virtual machine, JVM) 120; a memory/heap 130; and an application server 132 that enables access by software applications, using a connection pool (e.g., Oracle UCP) 140 and a database driver (e.g., a JDBC) driver) 150, to access or update data in a database 160.

Depending on the particular embodiment, client software applications 152 can be provided internally within the application server itself and/or located at the same computer, or alternatively can be provided at other locations that act as clients to the application server. The database can be similarly located at the same computer as the application server and/or its applications, or can be provided at other computers in communication via a network.

In accordance with an embodiment, the application server/database environment can also be provided within a cloud environment, and can enable access to the database by multi-user or multi-tenant cloud-based applications.

In accordance with an embodiment, software applications can make requests, such as a database query (e.g., a SELECT) 180, that is communicated to the database. In response, data is returned as a result set 182 (e.g., ResultSet) to the application server environment, to be stored in memory as one or more dynamic byte arrays (DBAs) within a result set cache 190, for use in responding to the application's request.

As further described below, if upon examining the sizes of the chunks associated with the DBA and the sizes of the data available within the chunks, the size of data to be stored in the DBA (191) is less than a prescribed threshold then, when the result set is returned, the database driver creates a static byte array (SBA) 192 in the result set cache, compacts the data 194 within the DBA into an SBA, which can have the same interface 195 as the DBA, and stores the data size of the DBA as part of the metadata 197 associated with the cache.

Figure 2:
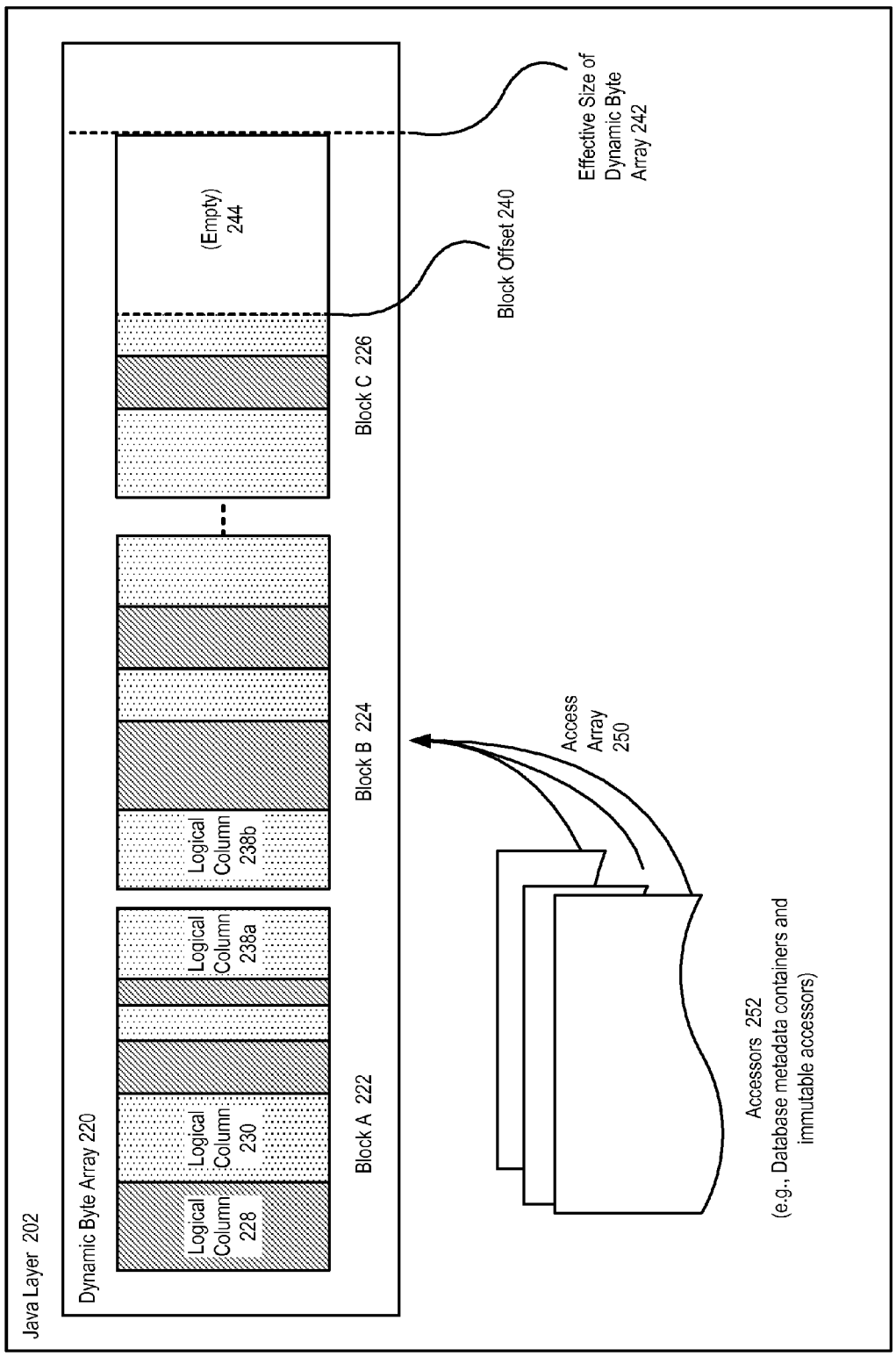
FIG. 2 illustrates an exemplary dynamic byte array including multiple blocks, in accordance with an embodiment.

FIG. 2 illustrates an exemplary dynamic byte array including multiple blocks, in accordance with an embodiment.

In accordance with an embodiment illustrated in FIG. 2, a DBA 220 allocated in the Java layer 202 may include a first block A 222 that is completely filled, and dynamically allocate a succession of additional blocks B 224 through C 226 as necessary, to store the data returned from the database. Offsets can be used to determine when to dynamically allocate additional blocks.

In accordance with an embodiment, all of the blocks allocated in the DBA can be the same size. In this example, a block can include a plurality of logical columns, e.g., 228, 230, and a logical column can spread across two different blocks. As an illustrative example, the block A does not have enough space to store the whole data of logical column 238. As such, part of the logical column 238a can be stored in the block A 222, and the rest of the logical column 238b can continue in the block B 224.

In accordance with an embodiment, a block offset 240 can be used to indicate the position of data within a block, and an effective size 242 of the DBA can also be provided to keep track of the size of the actual data that has been stored in the dynamic byte array. In this illustrative example, blocks A 222 and B 224 are completely filled, and block C 226 is less than half-filled with data. The remaining portion of the block 244 is unused or empty. The illustrative DBA 220 may be suitable for storing large amounts of data, for example as an access array 250, which may include immutable accessors 252 and corresponding database metadata containers and read-only immutable accessors.

With conventional approaches, the size of the result set cache is calculated every time a result set is returned. This generally requires, in the example of a DBA that is ever-expanding, all of the blocks to be processed to determine the actual size of the result set. This is a computationally-intensive operation, which requires the status of the cache to be sent to the server quite frequently (e.g., every minute), but which allows the client result cache to transparently keep the result set consistent with any session state or database changes that can affect the cached result sets.

Figure 3:
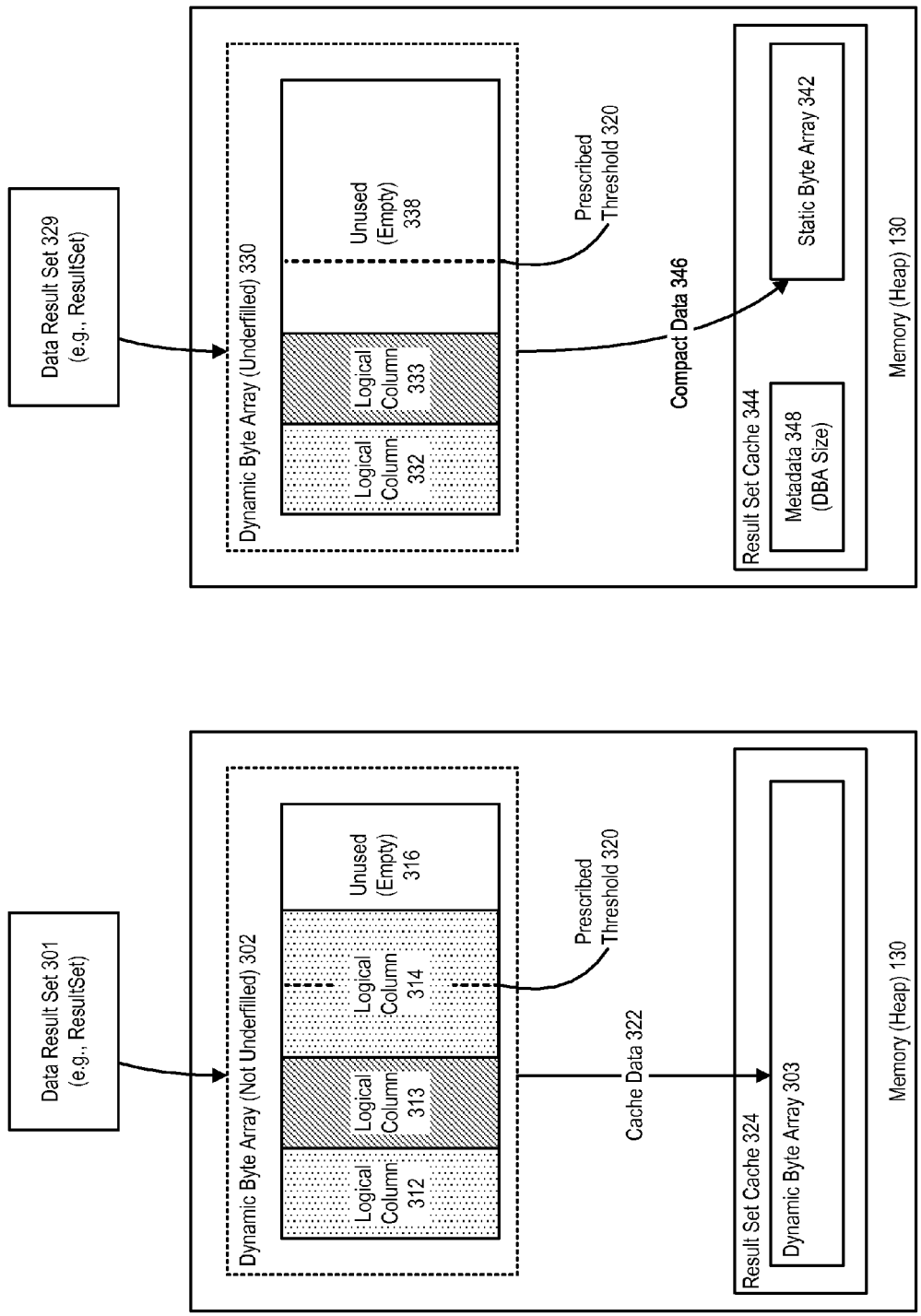
FIGS. 3A-3B illustrate an exemplary use of compacting dynamic byte arrays, in accordance with an embodiment.

FIGS. 3A-3B illustrate an exemplary use of compacting dynamic byte arrays, in accordance with an embodiment. In particular, FIG. 3A illustrates an exemplary pseudo linear dynamic byte array (DBA) 200 in accordance with an embodiment.

As shown in FIG. 3A, in accordance with an embodiment, the DBA can dynamically store data in any desired format (e.g., logical columnar data, immutable accessors, etc.). When space is to be allocated in memory for a required data, such as a data result set (e.g., ResultSet) 301 from the database, the system can ignore any maximum anticipated size (e.g., max_size) of the data expected to be received from the database and, instead, determine the actual size of the required data, and allocate a small block in the Java layer.

In accordance with an embodiment illustrated in FIG. 3A, the DBA may be, for example, a 32 kilobyte (kb) block from a buffer cache. The data 301 to be stored in the DBA 302 may include one or a plurality of logical columns (e.g., 312, 313, 314) for storing data returned from the database. The DBA may also include unused space 316. In this example, the logical columns comprise about 85% of the entire DBA (i.e., there is less than 15% unused space in the DBA having a file size of 32 kb), and the size of data to be stored in the DBA is greater than a prescribed threshold 320. Accordingly, the DBA 303 can be stored 322 without compaction in the result set cache 324.

In accordance with an embodiment illustrated in FIG. 3B, the data 329 to be stored in the DBA 330 may similarly include one or a plurality of logical columns (e.g., 332, 333) for storing data returned from the database. The DBA may also include unused space 338. In this example, the logical columns comprise less than 50% of the entire DBA, which in this case means that the size of data to be stored in the DBA is less than the prescribed threshold. Accordingly, a static byte array (SBA) 342 is created in the result set cache 344, and the data within the DBA compacted 346 into the SBA.

In accordance with an embodiment, the data size of the DBA is computed once and stored as a part of the metadata 348. In the next round trip to the database, if there is more result set to cache, the metadata is updated to account for the additional data. The updated number is also transmitted to the database server. This approach is more efficient than the conventional approach as there is no need to go through all the data result sets and send the results to the database. The data size is stored and maintained in the metadata associated with the result set cache.

In accordance with an embodiment, a calculation is made to determine whether the DBA should be compacted and stored in static byte array (SBA). For example, a calculation is made to determine if the DBA is under filled. For example, the size of the data in the DBA may be compared to the allocated file size of the DBA. If the comparison is below a prescribed threshold then the DBA is determined to be under filled. When the DBA is determined to be under filled, a new byte array in the form of a static byte array may be created to store the data from the DBA.

In accordance with an embodiment, the size of the compacted data in the DBA can be calculated to determine whether the DBA is underfilled, by examining the sizes of chunks in the DBA and sizes of data available within the chunks. If the data in the chunks are less than a prescribed threshold, the DBA can be determined to be underfilled, and a static byte array (SBA) can be created and be filled with the data in the DBA. For example, in FIG. 3B, the DBA 330 may be compacted because the corresponding data size is below a threshold value; while in contrast, DBA 302 may not be compacted because it was determined not to be underfilled, for example.

In accordance with an embodiment, the data size is determined at the time of caching, for example, performed just before the step of compacting the DBA into a SBA. The threshold used to determine whether the DBA is underfilled may be any desired value. Due to the amount resources needed to create a SBA, it is desirable that the threshold value be at least 60% underfilled. However, any desired threshold value may be used in accordance with embodiments to determine whether the DBA should be compacted into a SBA.

In accordance with an embodiment, when the static byte array is filled with the data from the DBA, the data can be compacted into the static bye array, which has the same interface with the DBA to the other components/modules of the system. In accordance with an embodiment, the existing interface of the static byte array can be overridden to avoid calculations used by the DBA for jumping data chunks when compacting data in the DBA. The step of compacting the data into the static byte array includes removing unused holes in the data and/or unused unused space within each row of data.

Figure 4:
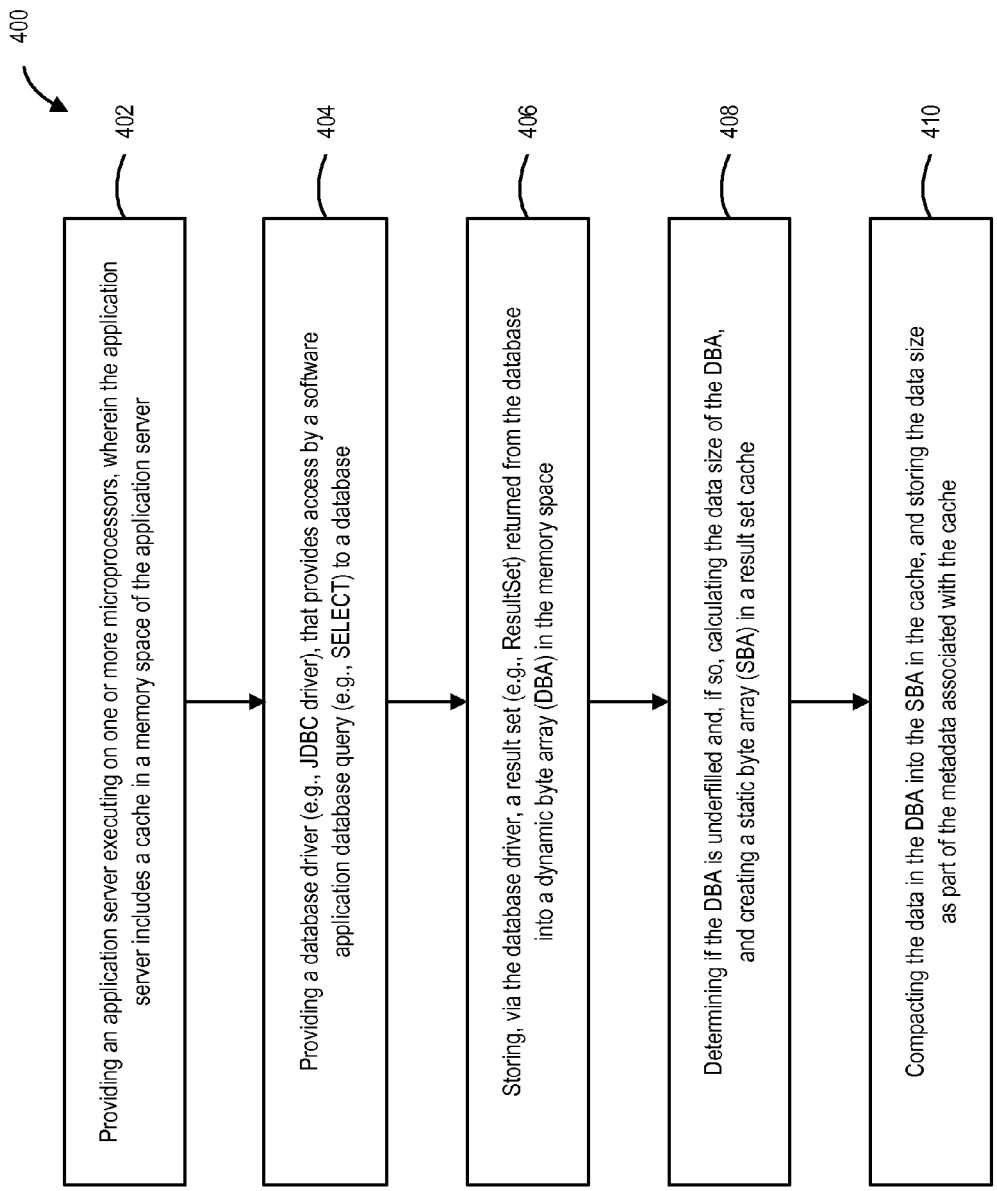
FIG. 4 is a flowchart that illustrates an exemplary method for compacting a pseudo linear dynamic byte array, in accordance with an embodiment.

Referring to FIG. 4, an exemplary method 400 for efficient storage and retrieval of fragmented data using a pseudo linear dynamic byte array is illustrated.

At block 402, the method includes providing an application server executing on one or more microprocessors, wherein the application server includes a cache in a memory space of the application server.

At block 404, the method includes providing a database driver (e.g., a JDBC driver), that provides access by a software application database query (e.g., a SELECT) to a database.

At block 406, the method includes storing, via the database driver, a result set (e.g., ResultSet) returned from the database into a dynamic byte array (DBA) in the memory space.

At block 408, a determination is made as to whether the DBA is underfilled and, if so, calculating the data size of the DBA, and creating a static byte array (SBA) in a result set cache.

At block 410, the data in the DBA is compacted into the SBA in the cache, and the data size stored as part of the metadata associated with the cache.

In accordance with an embodiment, compaction of the DBA into the SBA is performed only when then the DBA is determined to be underfilled, including that the size of data to be stored in the DBA is less than a prescribed threshold. For example, the DBA may be determined to be underfilled when the size of data compared to a file size associated with the DBA is below a threshold value of, e.g., 50%, 66%, or any other desired threshold value. The step of compacting the data into the static byte array can include removing unused holes in the data, and/or removing unused space within each row of data.

Embodiments of the present invention may be conveniently implemented using on or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for compacting a pseudo linear dynamic byte array (DBA) for storing a result set in a client cache, comprising:

a computer including memory and one or more microprocessors;

an application server;

a cache in a memory space of the application server; and a database driver that provides access by a software application to a database, wherein the database driver operates to store a result set returned from the database into a dynamic byte array (DBA) in the memory space, calculate a size of data in the DBA, determine that the size of the data in the DBA is less than a threshold, create a static byte array in the cache in response to the determination that the size of the data in the DBA is less than the threshold, and compact the data in the DBA into the static byte array in the cache.

2. The system of claim 1, wherein the step of compacting the data into the static byte array includes removing unused holes in the data.

3. The system of claim 2, wherein the step of compacting the data into the static byte array further includes removing unused space within each row of data.

4. The system of claim 1, wherein the threshold value is less than two-thirds filled.

5. The system of claim 4, wherein the static byte array is stored in a cache of the memory.

6. The system of claim 1, wherein the threshold value is less than half filled.

7. The system of claim 1, wherein a data size of the static byte array is determined prior to the step of compacting.

8. The system of claim 7, wherein the data size of the static byte array is stored in metadata associated with the static byte array.

9. A method for efficient storage and retrieval of fragmented data using a pseudo linear dynamic byte array, comprising:

providing an application server executing on one or more microprocessors, wherein the application server includes a cache in a memory space of the application server;

providing a database driver that provides access by a software application to a database;

storing, via the database driver, a result set return from the database into a dynamic byte array (DBA) in the memory space;

calculating a size of data in the DBA;

determining that the size of the data in the DBA is less than a threshold;

creating a static byte array in the cache in response to the determination that the size of the data in the DBA is less than the threshold; and compacting the data in the DBA into a static byte array in the cache.

10. The method of claim 9, wherein the step of compacting the data into the static byte array includes removing unused holes in the data.

11. The method of claim 10, wherein the step of compacting the data into the static byte array further includes removing unused space within each row of data.

12. The method of claim 9, wherein the threshold value is less than two-thirds filled.

13. The method of claim 9, wherein the threshold value is less than half filled.

14. The method of claim 9, wherein a data size of the static byte array is determined prior to the step of compacting.

15. The system of claim 14, wherein the data size of the static byte array is stored in metadata associated with the static byte array.

16. A non-transitory computer readable storage medium, including instructions stored thereon which when read and executed by one or more computers cause the one or more computers to perform the steps comprising:

providing an application server executing on one or more microprocessors, wherein the application server includes a cache in a memory space of the application server;

providing a database driver that provides access by a software application to a database;

storing, via the database driver, a result set return from the database into a dynamic byte array (DBA) in the memory space;

calculating a size of data in the DBA;

determining that the size of the data in the DBA is less than a threshold;

creating a static byte array in the cache in response to the determination that the size of the data in the DBA is less than the threshold; and compacting the data in the DBA into a static byte array in the cache.

17. The non-transitory computer readable storage medium of claim 16, wherein the step of compacting the data into the static byte array includes removing unused holes in the data.

18. The non-transitory computer readable storage medium of claim 17, wherein the step of compacting the data into the static byte array further includes removing unused space within each row of data.

19. The non-transitory computer readable storage medium of claim 16, wherein the threshold value is less than two-thirds filled.

20. The non-transitory computer readable storage medium of claim 16, wherein the threshold value is less than half filled.

* * * * *